United States Patent
Bachelder (12) United States Patent (10) Patent No.: US 7,221,805 B1
(45) Date of Patent: May 22, 2007

(54) METHOD FOR GENERATING A FOCUSED IMAGE OF AN OBJECT

(75) Inventor: Ivan Bachelder, Newton, MA (US)

(73) Assignee: Cognex Technology and Investment Corporation, Mountain View, CA (US)

( * ) Notice: Subject to any disclaimer, the term of this patent is extended or adjusted under 35 U.S.C. 154(b) by 561 days.

(21) Appl. No.: 10/034,288

(22) Filed: Dec. 21, 2001

(51) Int. Cl.
| | |
|---|---|
| G06K 9/40 | (2006.01) |
| G06K 9/00 | (2006.01) |
| G06K 9/56 | (2006.01) |
| G06K 9/68 | (2006.01) |
| G03B 13/00 | (2006.01) |
| H04N 5/232 | (2006.01) |
| G06K 9/32 | (2006.01) |
| G03B 17/00 | (2006.01) |
| H04N 5/228 | (2006.01) |

(52) U.S. Cl. ............... 382/255; 382/141; 382/205; 382/220; 382/300; 396/77; 348/208.12; 348/345

(58) Field of Classification Search ........ 382/255, 382/284, 220, 205, 254, 266, 141, 147, 148, 382/151, 152, 300; 396/77, 80, 82; 348/208.12, 348/345

See application file for complete search history.

(56) References Cited

U.S. PATENT DOCUMENTS

| | | | | |
|---|---|---|---|---|
| 4,404,594 A | * | 9/1983 | Hannan ................... | 348/355 |
| 4,616,262 A | * | 10/1986 | Toriumi et al. ........... | 348/597 |
| 4,661,986 A | * | 4/1987 | Adelson ................... | 382/255 |
| 5,040,228 A | * | 8/1991 | Bose et al. ............... | 382/141 |
| 5,179,419 A | * | 1/1993 | Palmquist et al. ........ | 356/73.1 |
| 5,319,734 A | | 6/1994 | Buzzetti | |
| 5,511,155 A | * | 4/1996 | Yamaguchi ............... | 345/643 |
| 5,535,002 A | | 7/1996 | Csipkes et al. | |
| 5,543,915 A | | 8/1996 | Csipkes et al. | |
| 5,596,672 A | | 1/1997 | Harman et al. | |
| 5,600,439 A | | 2/1997 | Csipkes et al. | |
| 5,636,020 A | | 6/1997 | Csipkes et al. | |
| 5,647,025 A | * | 7/1997 | Frost et al. .............. | 382/255 |
| 5,657,131 A | | 8/1997 | Csipkes et al. | |
| 5,671,049 A | | 9/1997 | Csipkes et al. | |
| 5,727,327 A | | 3/1998 | Wakabayashi et al. | |
| 5,729,622 A | | 3/1998 | Csipkes et al. | |
| 5,729,966 A | | 3/1998 | Grulick | |
| 5,768,401 A | | 6/1998 | Csipkes et al. | |

(Continued)

OTHER PUBLICATIONS

Kubota et al, IEEE Publication, 2000, "Inverse filtrs for reconstruction of arbitrarily focused images from two differently focused images".*

(Continued)

*Primary Examiner*—Bhavesh M Mehta
*Assistant Examiner*—Manav Seth
(74) *Attorney, Agent, or Firm*—Arthur J. O'Dea (57) ABSTRACT

A method is provided for computing a composite image representing a focused image of an object in an application of machine vision in an optical inspection system. An image tessellated into focus regions is evaluated by region for fine feature sharpness. A sharpness image is computed for each focused region using a fine feature sharpness measurement. A focused composite image is computed by combining as a weighted average, the images at several focus settings, using the sharpness image at each focus setting as the weight. The focused composite image can be further analyzed, inspected, or otherwise processed.

13 Claims, 8 Drawing Sheets

U.S. PATENT DOCUMENTS

| | | |
|---|---|---|
| 5,768,409 A | 6/1998 | Csipkes et al. |
| 5,809,162 A | 9/1998 | Csipkes et al. |
| 5,857,047 A | 1/1999 | Strand et al. |
| 5,857,049 A | 1/1999 | Beranek et al. |
| 5,862,250 A | 1/1999 | Csipkes et al. |
| 5,898,494 A | 4/1999 | Csipkes et al. |
| 5,923,781 A | 7/1999 | Csipkes et al. |
| 5,995,212 A | 11/1999 | Dar et al. |
| 6,069,991 A | 5/2000 | Hibbs-Brenner et al. |
| 6,088,498 A | 7/2000 | Hibbs-Brenner et al. |
| 6,105,396 A | 8/2000 | Glodis et al. |
| 6,183,343 B1 | 2/2001 | Buzzetti |
| 6,603,874 B1 * | 8/2003 | Stern et al. .................. 382/144 |
| 6,831,694 B2 * | 12/2004 | Ohki .......................... 348/349 |

OTHER PUBLICATIONS

Evan Lubofsky, Machine vision takes guesswork out of fiber-polishing inspection, Laser Focus World, Sep. 2001.

* cited by examiner

METHOD FOR GENERATING A FOCUSED IMAGE OF AN OBJECT

CROSS-REFERENCE TO RELATED APPLICATIONS

The present invention is related to the commonly assigned U.S. Pat. No. 6,632,298 entitled "Method and Apparatus for Focusing an Optical Inspection System," the content of which is expressly incorporated herein by reference.

BACKGROUND OF THE INVENTION

This invention relates to the field of machine vision, and its application in obtaining an optimally focused image of an object under analysis. Specifically, the invention addresses a need for obtaining an optimally focused image under high magnification of a portion of a transparent or translucent surface that is not perfectly flat, though, it can be used to inspect the surface of virtually any object.

Inspection operations in an industrial environment are typically performed to characterize manufacturing operations, and to ensure that quality and product specification requirements are met. Many inspection operations can be extremely tedious for human operators performing manual inspection, and the application of machine vision is typically used to improve the consistency and accuracy of an inspection operation, while relieving an inspection operator from performing the task. For example, the application of machine vision-assisted inspection of fiber optic cable assemblies has recently been the subject of much development.

Fiber optic cable assembly operations require the inspection of fiber optic cable end faces to ensure that fiber connections do not degrade optical signal transmission. Scratches, cracks, and debris on critical areas of the interconnection interface may result in defective operation, or result in a degradation of performance. High-magnification inspection of the fiber end face is typically performed during assembly to inspect the condition and cleanliness of the fiber.

Inspection of the end face of a fiber optic cable is inherently difficult because of the properties and characteristics of the fiber. The regions of the fiber end face that require inspection are generally translucent, and exhibit low contrast of features when imaged for machine vision applications. The translucent nature of the fiber optic cable contributes to difficult lighting conditions since illumination intended for inspection of the surface also enters the fiber, and may reflect back into the machine vision system, causing image noise. Moreover, images of similar fiber ends typically appear significantly different under identical lighting conditions.

Automation of the inspection of fiber optic cable end faces using machine vision improves efficiency, and minimizes and/or avoids the subjectivity of human assessment. Effective implementation of machine vision in an automated inspection process requires a properly focused image of the area under analysis. However, since the fiber end surface is typically non-planar, it is difficult to acquire a single image of the fiber end surface for inspection that is optimally focused, because the depth of field at high magnification is typically less than the extent to which the surface is non-planar.

To provide an optimally focused image of planar fiber end surfaces, the prior art suggests the combination of images acquired at different focus planes in front of and behind an optimal focus position. While this method is effective for evaluation of surface features having a non-zero depth, its utility is limited to planar surfaces. Other known methods suggest the acquisition of multiple sectional images from a single focus setting, and combining the sectional images into a single combined image, though such an apparatus can be extremely complex.

Thus, a need exists for the capability of generating an image in an optical inspection system of a non-planar surface from a single image acquisition source.

BRIEF SUMMARY OF THE INVENTION

This invention overcomes the disadvantages of the prior art by providing a focused image by generating a composite image of images that may be acquired at several focus settings. In one general aspect of the invention, an image with at least one region is acquired. A fine feature sharpness measurement performed on the region to produce a sharpness score for the region. The sharpness score is used to determine a spatial weighting. A composite image can then be computed by using the acquired image and the spatial weighting. For example, if an image region exhibits a high degree of fine feature sharpness characteristics, it will be weighted highly in the weighting image, and therefore, factored heavily in the composite image. A blurry image region, with a resulting low sharpness measurement is effectively excluded from the composite image.

The composite image can be an incremental weighted average of the image region and the weighting image, to compute the composite image while images are acquired over a plurality of focus settings.

In another aspect of the invention, the images of the object can be provided over a plurality of focus settings. An image region in at least one image is evaluated for a sharpness score, by measuring the fine feature sharpness of the image region. A spatial weighting can be determined for the image region using the sharpness score, and a composite image is generated using the spatial weighting and the image region.

In still another aspect of the invention, an object, such as a fiber optic cable end face, can have focus regions predetermined prior to run-time. At run-time, the focus regions can be found and aligned in the image to provide image regions.

The image regions can employ fuzzy transitions using sigmoid, gaussian or linear functions to define the transition, and the regions can overlap.

Still other advantages of the present invention will become readily apparent to those skilled in the art from the following detailed description. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE SEVERAL VIEWS OF THE DRAWING

The invention will be more fully understood from the following detailed description, in conjunction with the accompanying figures, wherein:

FIG. 2b is a cross-sectional view of the fiber optic cable represented in FIG. 2a.

DETAILED DESCRIPTION OF THE INVENTION

Figure 1:
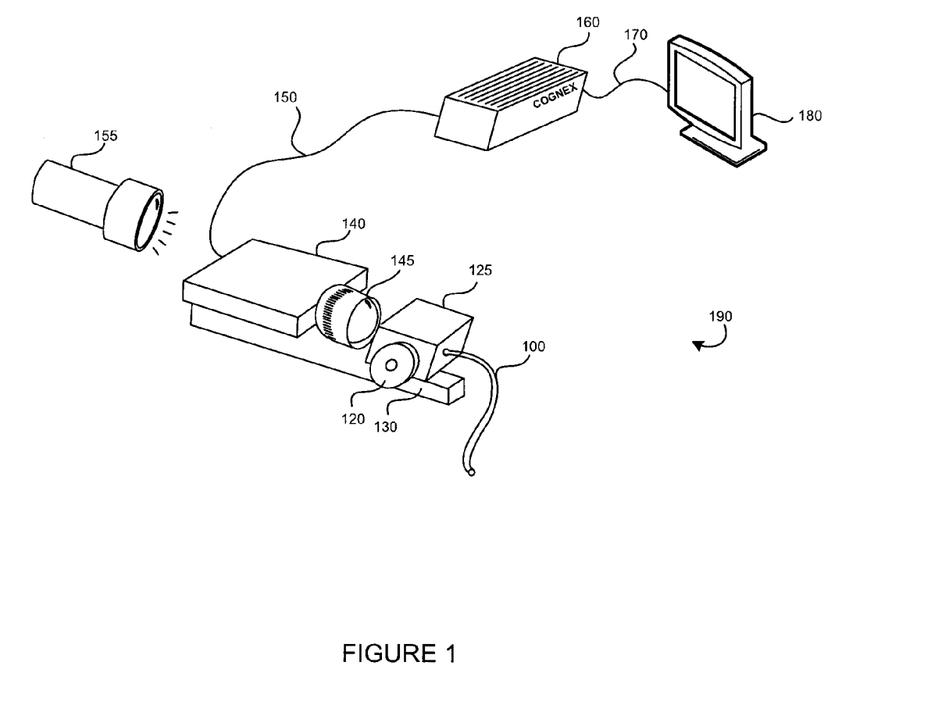
FIG. 1 is a depiction of an apparatus for the inspection of a fiber optic cable end.

FIG. 1 depicts a fiber optic fiber end inspection system 190 used to inspect the end face of a fiber optic cable 100. A camera 140 having a lens 145 is mounted to an inspection frame 130 and directed to an inspection fixture 125. The fiber optic cable 100 end face is presented to the lens 145 by inserting the fiber optic cable 100 end into the inspection fixture 125. A typical fiber optic end inspection system 190 will employ a microscope adapted for inspection of fiber, or fiberscope, to provide significant magnification of the fiber optic cable 100 end as it is presented to the lens 145 of the camera 140. The fiber optic cable 100 end face is illuminated by a light source 155. The inspection fixture 125 has a focus adjustment mechanism 120 that facilitates translation of the inspection fixture 125 relative to the camera 140 and inspection frame 130. Rotation of the focus adjustment mechanism 120 changes the distance between the lens 145 and the inspection fixture 125. One skilled in the art will appreciate that alternate embodiments exist where the camera 140 or lens 145 can be moved relative to the inspection fixture 125 to adjust positioning and/or focus of the inspection system 190.

The camera 140 is coupled to a machine vision processor 160 through an image data transmission cable 150. The machine vision processor 160 acquires an image of a portion of the fiber optic cable 100 end and performs an analysis of the image to perform an inspection. A display 180 is coupled to the machine vision processor 160 through a display cable 170 so that the image, focus parameters, and the result of the inspection can be reported to an operator.

Figure 2A:
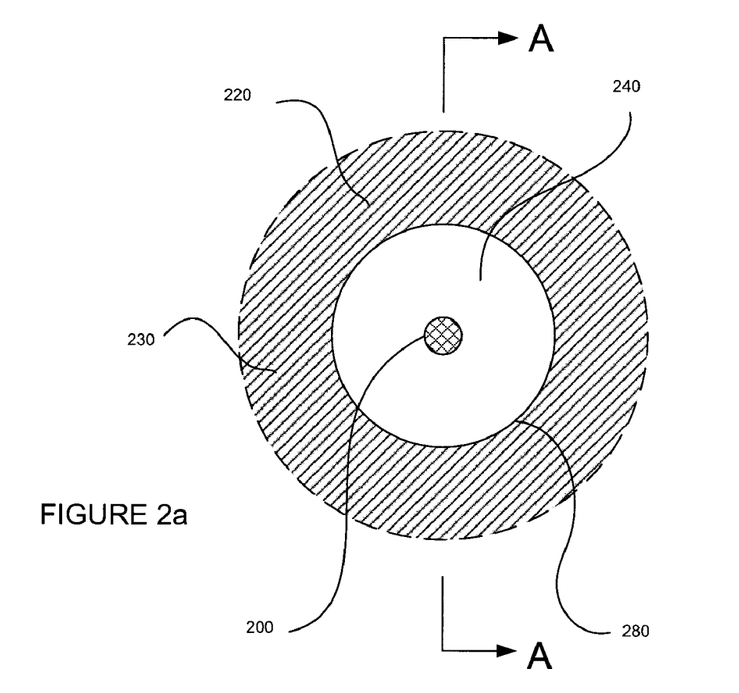
FIG. 2a is a plan view of the end of a fiber optic cable.

The fiber optic cable 100, as viewed by the camera 140 in the fiber end inspection system 190, is depicted in FIG. 2a. The fiber optic cable 100 has a core 200, through which an optical signal is transmitted in operation. The core 200 is surrounded by a cladding 240, and a buffer 220. The optical signal transmitted through the core 200 is propagated by internal refraction as known in the art, as it reflects off the cladding 200 that is positioned around the core 200. The core 200 is made of pure glass drawn out into a fine strand. The cladding 240 is one or more layers of doped glass, which are doped to have a lower index of refraction than the core 200. Thus, the cladding 240, as known in the art, causes the optical signal to be directed back into the core. The buffer 220 surrounds the cladding to isolate and protect the core 200 and cladding 240. Additional shielding and insulation is typically applied for further protection.

Fiber optic cable is classified by transmission type, where transmission types include single-mode or multi-mode, for example, where mode is a term known in the art. Single-mode cable is used to transmit one mode of light, where multi-mode fiber acts to transmit a broader bandwidth of light in the form of a multiplexed optical signal. Typically, the diameter of the core 200 of multi-mode fiber is larger than single mode fiber. Multi-mode fiber core is approximately 62 microns in diameter, while single mode fiber core is approximately 8 microns in diameter, at the current level of technology. Both types of cable have a cladding diameter of typically 125 microns.

Within a fiber optic system, the fiber optic cable 100 is cut and connected or spliced to other fibers, transmitters, and/or receivers, with various connector configurations. After cutting the core 200, the cladding 240, and any surrounding layers present at, or near, the fiber optic end face are polished by processes and techniques known in the art, to form a termination. Typically, the termination is inspected after polishing, or during routine maintenance or cleaning, and after connecting or disconnecting fibers.

Figure 2B:
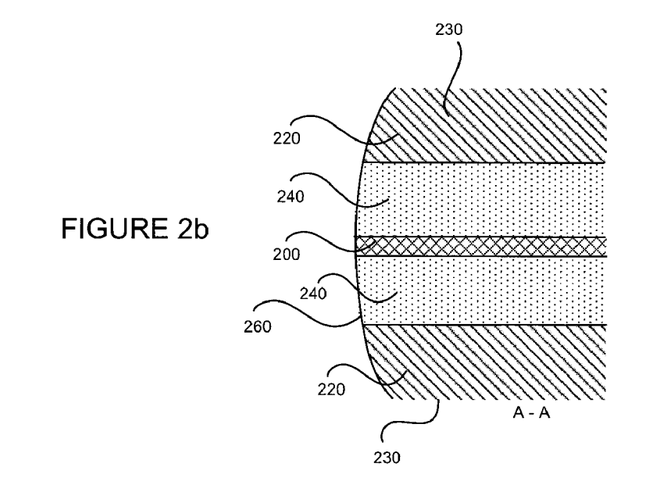

A fiber optic cable 100 termination will typically employ a ferrule 230 for supporting the fiber in place of the buffer 220. An annular interface region 280 forms the interface between the cladding 240 and the buffer 220 or ferrule 230. FIG. 2b depicts a cross-sectional view of the fiber optic cable 100 through section A—A of FIG. 2a. The fiber end surface 260 can be polished, and is typically not flat, having a slight curvature, as shown in FIG. 2b. Various fiber optic cable 100 end configurations exist having similar non-planar end profiles. During an inspection of the fiber end surface 260 at high magnification, the curvature prevents the fiber optic fiber end inspection system from obtaining an image of a portion of the fiber end surface 260 that is completely in-focus.

Figure 3:
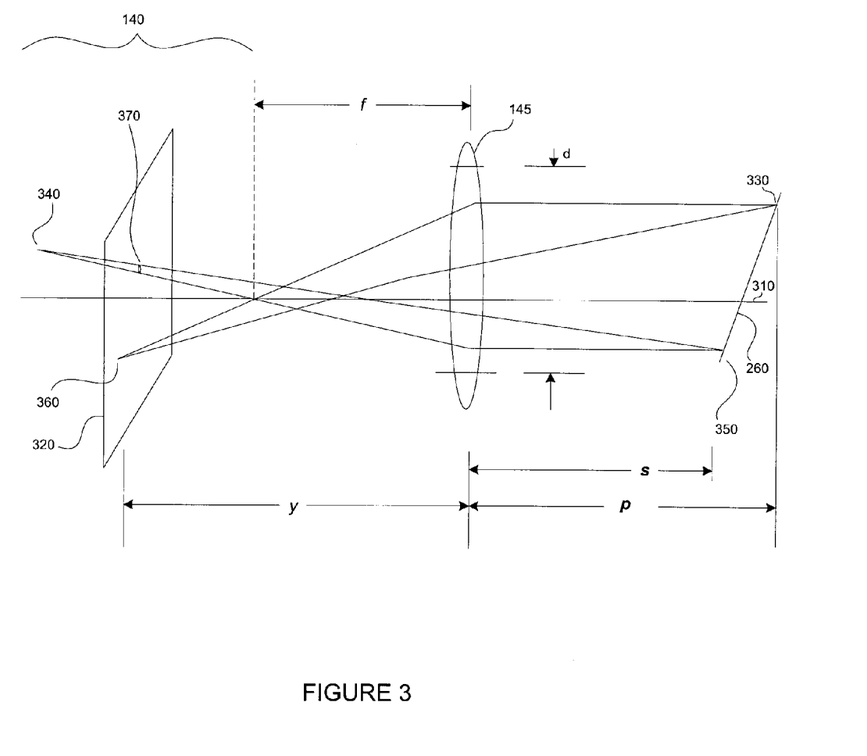
FIG. 3 is a schematic view of a portion of the apparatus of FIG. 1.

Portions of the fiber optic end inspection system 190 are modeled schematically in FIG. 3, and explained fundamentally herein, though it is commonly known in the art that several optical models that can be applied to such an inspection system. The lens 145 having a focal length f projects an image of a portion of the fiber optic end surface 260 on a CCD (Charge Coupled Device) sensor 320 in the camera 140 along an optical axis 310. A sharp image of a portion of the fiber optic end surface 260 can be formed on the CCD sensor 320 according to the thin lens equation where p is the distance from the lens 145 to the fiber optic end surface 260 and v is the distance from the lens 145 to the CCD sensor 320 in the camera 140:

$$(1/p)+(1/v)=(1/f)$$

A sharp image of a portion of the fiber optic end surface 260 represented by reference numeral 330 is formed on the CCD sensor 320 represented by reference numeral 360. If the object is positioned at a distance s for a given focus adjustment v, as represented by reference numeral 350, a circle of confusion 370 forms on the CCD sensor 320, which results in an out-of-focus image. The circle of confusion 370 diameter can be calculated as:

$$C = \left| f * d * \left(\frac{p}{s} - 1\right) * (p - f) \right|$$

where d is the aperture diameter, p is the object distance to the lens for a perfect focus, and s is the distance from the lens to the object to be imaged as represented by reference numeral 350.

An image of a portion of the fiber optic end surface 260 is formed on the CCD sensor 320 by combining the circles of confusion, e.g., reference numeral 370, corresponding to each point on the fiber optic end surface 260, e.g., reference numeral 350. If the image is significantly out of focus |p−s|>>0, the image will be affected mostly from the general structure (low frequency structure) in the scene. This general structure contributes to the low frequency structure of the image portion for all values of s. Small changes in s will not critically affect features corresponding to the general structure of the image portion. As the image of a portion of the fiber optic end surface 260 nears sharp focus, i.e., |p−s|≅0, the image will be affected from the fine structure (high frequency structure) in the scene. Any small change in s will result in a considerable response from the fine structure in the image.

Figure 4:
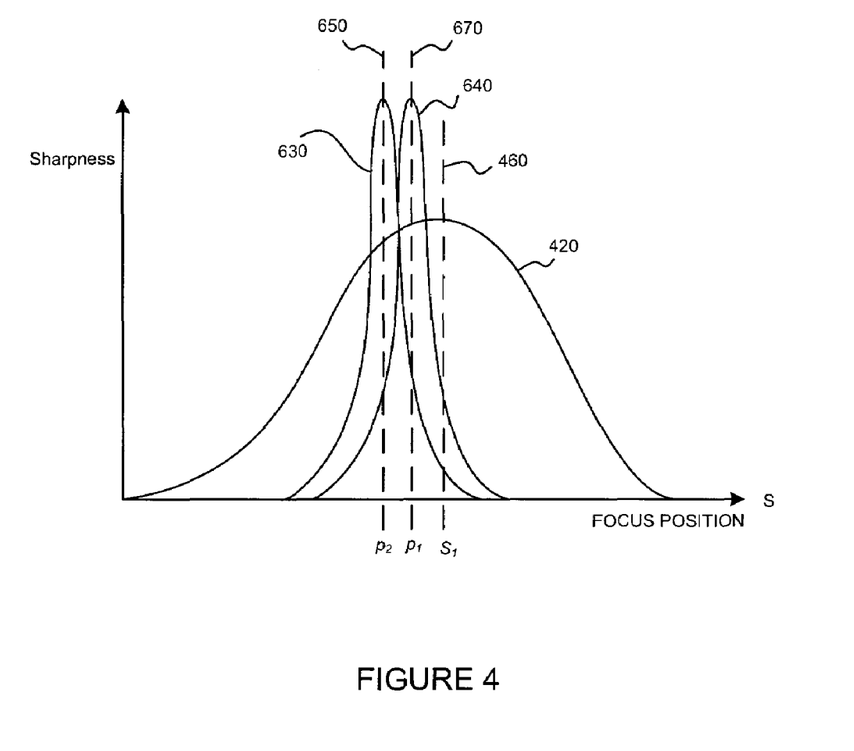
FIG. 4 is a graphical representation of the relationship between the sharpness of features in a portion of the image of a non-planar surface and a focus position.

FIG. 4 graphically depicts the relationship of a sharpness response of a portion of an image as a function of the position of the fiber optic end surface 260 relative to the lens 145 of the camera 140. A coarse feature sharpness response 420 associated with the low frequency structure has a maximum coarse feature sharpness 460 at focus position $s_1$. A first fine feature sharpness response 640 associated with the higher frequency structure of the surface features of a first focus area has a maximum fine feature sharpness 670 at the a focus position $p_1$. A second fine feature sharpness response 630 associated with the higher frequency structure of the surface features of a second focus area has a maximum fine feature sharpness 650 at focus position $p_2$.

Figure 5:
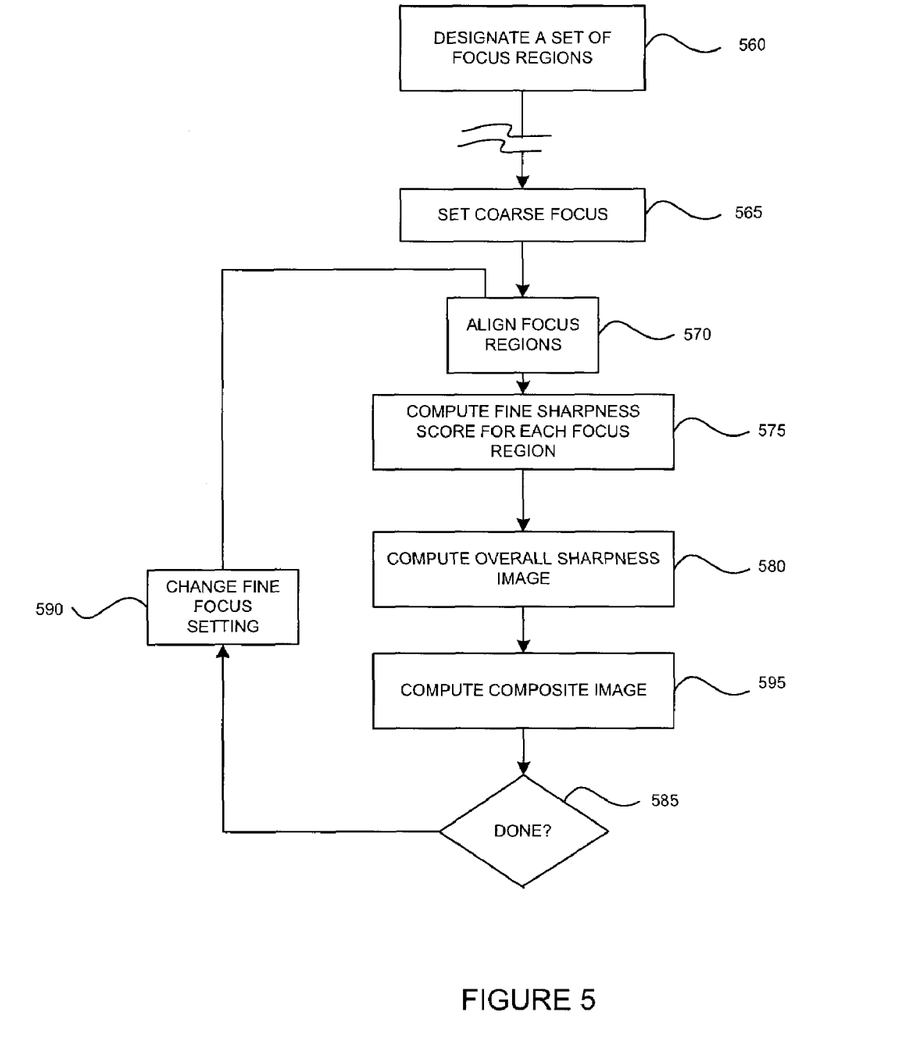
FIG. 5 is a flowchart of the method of the present invention.
Figure 7:
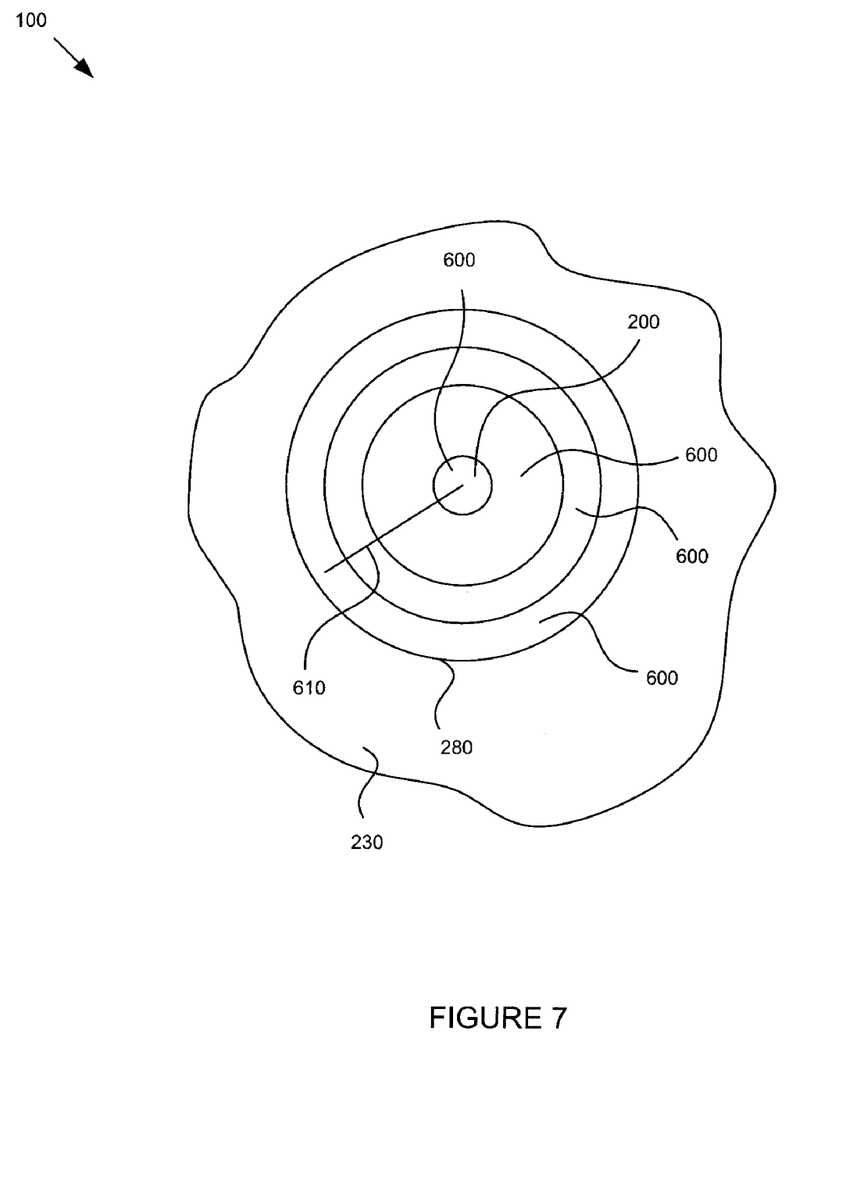
FIG. 7 is a plan view of the end of a fiber optic end face.

FIG. 5 describes the method of the present invention in its preferred embodiment. First, a step to designate a set of focus regions 560 is performed on the surface of the object under analysis. This designation step 560 is performed during a configuration or set-up phase of the inspection, the results of which are shown in FIG. 7. The designation step 560 results in a set of focus regions 600 that can be used to measure the fine feature sharpness in a piecewise manner. Focus regions 600 should be defined such that the portion of the surface of the object covered by each region 600 will be completely in focus for at least one focus setting, and such that each portion of the surface of the object for which accurate measurements must be made is covered by at least one region 600. Focus region 600 boundaries might be either sharp or fuzzy, and they can overlap each other. A focus region 600 with sharp boundaries might, for example, be represented as a binary region map image (whose pixels correspond with an image model of the object), where a pixel value of 1.0 indicates that the portion of the object corresponding to the pixel is within the region, and a pixel value of 0.0 indicates that the portion of the object corresponding to the pixel is outside the region. A focus region 660 with fuzzy boundaries might, for example, be represented as a gray scale region map image, where a pixel value of 1.0 indicates that the portion of the object corresponding to the pixel is within the region 600, a pixel value of 0.0 indicates that the portion of the object corresponding to the pixel is outside the region 600, and a pixel value between 0 and 1 indicates that the portion of the object corresponding to the pixel is partially within and partially outside the region 600 (another way of interpreting this "fuzzy" inclusion is that the pixel value indicates the probability that the portion of the object corresponding to the pixel is within the region).

In a preferred embodiment, focus regions 600 do not include contours within the object that are known to be depth discontinuities on the surface of the object. Such contours should form sharp boundaries between non-overlapping focus regions. It is also preferred that the boundary between two focus regions 600 is fuzzy when the depth to the object at that boundary is known to be continuous, and that there is substantial overlap between the focus regions at fuzzy boundaries. This arrangement of regions 600 ensures that the pixels arising from points on the object that are near the border between two contiguous portions of the object are considered to be at least partially within the regions on each side of the border. Finally, it is preferred that there be as few focus regions 600 as possible, and that the focus regions 600 be as large as possible.

Figure 6:
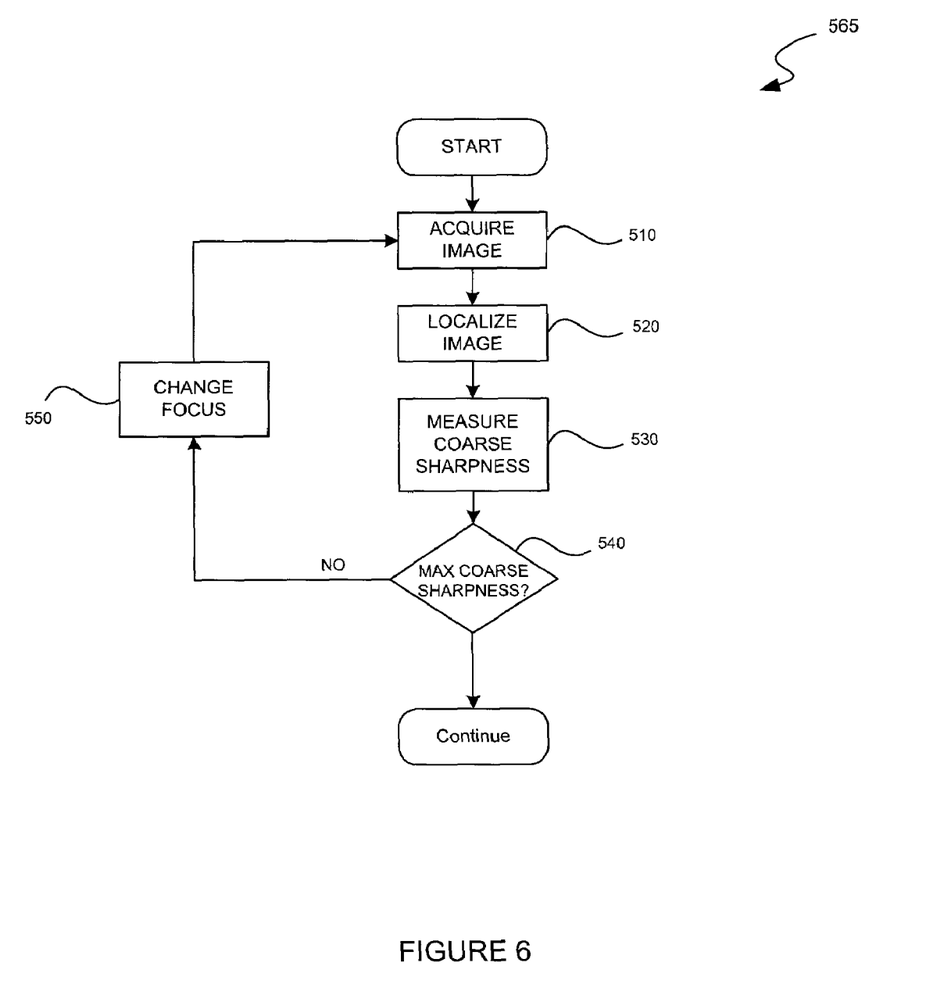
FIG. 6 is a flowchart of the step of setting the coarse focus in the present invention.

For example, the focus regions 600 used for an end of a fiber optic end face that is dome-shaped might be annular rings of the fiber centered about the fiber core 200, as depicted in FIG. 2a and FIG. 6. Each annular ring is as wide as possible, but narrow enough to ensure that the entire portion of the surface of the object under the ring will be completely in focus for at least one focus setting of the optical system. Since there are typically no depth discontinuities on the surface of a polished fiber end, each annular ring is represented using fuzzy boundaries, and neighboring rings overlap at their boundaries. In one particular embodiment, each annular focus region 600 has fuzzy boundaries represented by a range of radii from the center of the fiber and an overlap distance parameter that is some fraction of the range. Those points within the range are considered to be completely within the region (100%), those points outside the range by more than the overlap distance are considered to be completely outside the region (0%), and all other points are considered to be within the region to an extent equal to a sigmoid function that is maximally 100% at the boundary and minimally 0% at a distance of the overlap distance from the boundary, with points in between ranging smoothly between 100% and 0%. One skilled in the art will appreciate that other functions can be used to define the transition between regions, such as gaussian, or linear transition.

Figure 8:
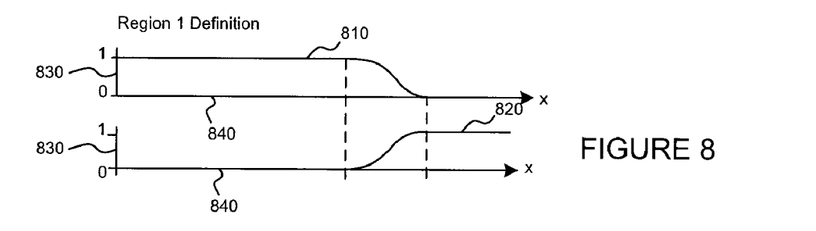
FIG. 8 is a graphical depiction of the region definitions used in the exemplary embodiment of the present invention.

FIG. 8 graphically depicts an exemplary definition of two regions as a one-dimensional image representation 610 using fuzzy boundaries. A first region definition 810 has a weighting value 830 of one (100%) for a portion of neighboring pixels across the image pixel position 840. The first region definition gradually transitions to a weighting value 830 of zero (0%) according to a sigmoid function. The rate of fall-off should be proportional to the slope of the object surface (i.e., how quickly the object sharpness will change as a function of distance from the boundary). A second region definition 820 has a weighting value 830 of zero (0%) for the portion of the image pixel position 840 where the first region definition 810 weighting value 830 is one (100%), and the second region definition 820 has a weighting value 830 of one where the first region definition 810 weighting value 830 is zero.

Alternatively, the region definition step 560 can be performed during run-time within the coordinate system of the acquired image, rather than the coordinate system of the object. One way to effect this run-time definition entails simply tessellating a sub-set of the image into focus regions 600. Focus regions 600 can be determined by tiling the image into square subsections or, alternatively, using overlapping circular subsections. Again, it is most ideal that these regions be as large as possible, with fuzzy boundaries that overlap to some degree. Note, however, that the size of run-time determined focus regions 600 cannot generally be custom-tailored to account for known surface properties of the object, as they can with the off-line, object-centered focus region definition. For this reason, all run-time determined focus regions 600 will tend to be the same size, governed by a "worst case" scenario, in which a particular region contains that portion of the object with the largest depth gradient. Moreover, it is impossible to ensure that depth discontinuities are not contained within the regions, which would result in the final composite image having unavoidably blurred portions of the object.

An alternate method to determine focus regions 600 at run-time is to use machine vision techniques to extract the locations of features that are likely to arise from structures on the object. These features may be associated with portions of the object that may ultimately be further processed in an inspection operation performed on the final composite image. For example, in the fiber end inspection application, such features are ideally those arising from scratches, cracks, pits, and other defects that must be detected within the composite image. Focus regions 600 can then be formed using these features. The size of such regions will again to be limited to the worst-case scenario described previously; however, the selective placing of focus regions 600 avoids depth discontinuities that do not resemble the structures of interest, and makes subsequent processing steps more efficient by ignoring those portions of the image that are not important. For example, one might employ an edge detection tool such as those commonly known in the art to find edge contour chains in the image that are likely to arise from scratches and cracks. The regions might then be defined by constructing narrow neighborhoods oriented along such contours e.g. oriented Gaussian neighborhoods.

Step 570 is performed to align the object with an image of the object that has been acquired using the imaging setup. Note that this step 570 can actually be performed before, after, or in parallel with the focus region designation step 560. However, the focus region designation step 560 is typically only performed once for a particular type object (typically off-line during set-up), whereas the alignment step 570 is performed once for each instance of the object (during run-time).

At run-time, the fiber optic inspection system 190 is configured to present the fiber optic cable 100 to the camera 140. The set coarse focus step 565 is further described in FIG. 6, and is performed over a range of possible focus settings of various distances from the fiber optic cable 100 to the lens 145 of the camera 140. Generally, the set coarse focus step 565 results in setting the focus of the fiber optic inspection system 190 such that the sharpness of the features associated with the overall structure of the object under analysis is maximized.

The machine vision processor 160 acquires an image of a portion of the fiber optic end surface 260, according to the acquire image step 510. Step 520 localizes the image to include only the region containing structure elements of the fiber optic cable 100 in the image of a portion of the fiber optic end surface 260. In the preferred embodiment, the interface between the cladding 240 and the ferrule 230 is the most consistent and reliable feature to locate for a coarse focus adjustment. This feature can be interpreted as a circular pattern to which standard machine vision search tools can be applied using a number of alternative techniques. For example, normalized correlation search, including one that uses templates at a variety of rotations and scales, may be used. Alternatively, a geometric feature-matching search tool capable of aligning several degrees of freedom, such as translation, rotation, and scale, may be used. A further possibility for the localization step 520 is to employ the Generalized Hough Transform, including extensions of which that are scale-invariant and orientation-invariant, as is known in the art. The use of any alignment technique is within the scope of the present invention. In a preferred embodiment, the geometric feature-matching tool PatMax® from Cognex Corporation can be trained on a circular model of the interface between the cladding 240 and the ferrule 230 to find an annular interface region 280.

Step 530 measures a coarse feature sharpness of the localized image of step 520. The coarse feature sharpness can be represented as the diameter of the circle of confusion 370 in the image of the structure of the fiber optic end surface 260. In the preferred embodiment, an assessment of the edge features of the found annular interface region 280 can be made to represent a sharpness measurement.

The caliper tool from Cognex Corporation can be applied to the found annular interface region 280 to provide a numerical assessment of the sharpness of the edge features of the found annular interface region 280. In the preferred embodiment, approximately one hundred caliper tools are placed at evenly spaced intervals over the circumference of the annular interface region 280. Each tool scores the contrast of the transition from the cladding 240 to the ferrule 230. A higher score is expected in the assessment of a clearly defined, sharply focused transition.

A maximum average caliper score measurement indicates a maximum sharpness measurement, since the diameter of the circle of confusion 370 of the edge features of the interface between the cladding 240 and the ferrule 230 in the image of step 520, approaches zero.

Alternatively, the coarse feature sharpness measurement can be determined using standard edge detection techniques. The image of step 510 must be filtered or smoothed to remove fine structure of the image. A mask must be generated to remove features not associated with the annular interface region 280 found in the localization step 520. Edge detection can be applied to the filtered and masked image to return edgelets and their magnitudes. A coarse feature sharpness measurement can be represented by the summation of the magnitudes. As the structure features are brought into focus, the contrast of the edges in the image will increase. A maximum contrast of the structure features can be associated with a sharpness measurement, indicating an optimal coarse focus.

Step 540 compares the coarse feature sharpness measurements of step 530 with the coarse feature sharpness measurements made at other focus settings. When sharpness measurements are absolute, images must be acquired in at least two focus settings for a maximum sharpness value to be determined. If sharpness measurements are relative, only one image is necessary for comparison. Step 540 initiates a loop that repeats steps 510, 520, and 530 for the range of possible focus settings, while retaining the value of the maximum sharpness measurement. Step 550 changes the focus setting in the range of possible focus settings in the loop to determine the maximum coarse feature sharpness measurement. The loop terminates when a maximum sharpness measurement has been identified, and the process continues with the fiber optic inspection system 190 set to the focus setting having the maximum coarse feature sharpness measurement of step 530.

Focus adjustment step 550 can be performed several ways. The most basic method is the most exhaustive; sharpness scores can be stored for images acquired at a complete range of focus settings with a reference to the focus setting. Comparison of the sharpness measurements of step 530 can be performed on the stored values, and the focus setting that produces the maximum sharpness score is selected for further processing.

A more sophisticated and efficient method is commonly known as hill-climbing, or gradient descent. The sharpness measurements of step 530 are performed on two images of different focus settings. A comparison of the two sharpness measurements (a form of relative sharpness measurement) can be performed to determine the direction for the focus adjustment to expect an increased sharpness measurement. Optionally, a measure of the magnitude of difference between the sharpness measurements can be used to determine the extent of focus adjustment; i.e., the focus adjustment step can be proportional to the difference between the sharpness measurements. This process continues until the maximum sharpness is determined at step 540.

A third method of adjusting the focus setting of step 550 is a bisection method. The pass through the loop of steps 510, 520, 530, and 540 is performed at a first extreme end of the focus range. The second pass through the loop of steps 510, 520, 530, and 540 is performed at the opposite extreme end of the focus range. The third pass is performed at an approximate midpoint. Subsequent passes through the loop are performed at a focus setting that is the approximate midpoint between the focus settings returning two highest sharpness scores of the images from the three preceding focus settings.

When the system 190 is set to the focus setting returning the maximum coarse feature sharpness score from step 530, the portion of an image near the annular interface region 280 can be considered to be coarsely focused. In the preferred embodiment, this focus setting is the starting point for generating a composite image of a portion of the fiber end surface 260, as control proceeds to an align focus regions step 570. Note, however, that set coarse focus step 565 does not require determining the optimal coarse focus position, and the foregoing discussion shall not be considered to be a limitation. In fact, it is not even necessary that the rough focus position is even near the peak of any of the fine focus positions for any of the regions. It is merely sufficient that the set coarse focus step 565 determine a setting for which the coarse feature sharpness measurement is relatively high.

An align focus regions step 570 aligns the focus regions 600 of an acquired run-time image within the coordinate system of which the object has been aligned to provide image regions. For example, if the focus regions 600 are described as a set of gray scale or binary region map images that correspond to the image model that was used to align the object, an aligned region map image can be computed by transforming the region map images using the alignment pose, the computation of which is commonly known in the art. In the case where an affine (2D, linear) alignment pose for the object has been determined (as is the case with PatMax®, for example), this step amounts to affine transforming each of the region map images to produce a set of aligned region map images, or image regions. The alignment step 570 is obviously unnecessary if the image regions are defined at run-time using image coordinates or from extraction of features of the image.

In the exemplary embodiment for the fiber end inspection application, the geometric information describing the focus regions 600 are simply transformed by the pose of the geometric model defining the fiber to determine a set of aligned annular regions, an operation commonly known in the art. Following this transformation, each aligned annular region is converted into aligned gray-scale region map by rendering an image of the aligned annular region in such a way that pixels completely within the annular region (in the 100% portion) are given a value of 1.0. Pixels completely outside the annular region (in the 0% portion) are given a value of 0.0, and all other pixels are given a value that is equal to the percentage returned by the transformed sigmoid function that defines the transition between regions.

Step 575 computes a fine feature sharpness score for each of the image regions within the image at the sampled focus setting. The focus score can be represented as a measurement of fine feature sharpness in the image region. A measurement of fine feature sharpness can be based on the amount of image detail in the pose, region, or zone in the image region. The amount of image detail is directly proportional to the number of edgelets detected by a machine vision edge detection algorithm.

Alternatively, fine feature sharpness measurement can be attributed to the amount of information in the pose, region or zone in the image region. A measured entropy calculation can be performed on the image region to provide a score or fine feature sharpness measurement. A mask is generated to expose only the region of interest. The image entropy score for an image having pixel coordinates i, j can by calculated by:

$$-\sum_i \sum_j P(i, j)\log(P(i, j))$$

where P is the probability that a given greylevel or intensity exists for the pixels in the image. An image having little detail, with a narrow distribution of greylevels, such as a blurry, out-of-focus image, will return a low entropy score. An image that is optimally focused, will return a relative higher entropy score, since detail in the image has a broad distribution of pixel intensity greylevel values.

Fine feature sharpness can also be measured by transforming the image region into frequency space, using techniques known in the art, such as FFT (Fast Fourier Transform), and measuring the density of high frequency components of the power spectrum image. Each point in the image region can be represented by a sum of spatial frequencies. Low frequency components describe general structure of the image, while high frequency components are associated with sharp edges of features and the fine detail in the image. An out-of-focus image will display blurred edges, and will therefore exhibit a low density of high-frequency components in the power spectrum of the image. As the image is brought into focus, and edges become more clearly distinct, high frequency components will emerge in frequency space. An image that is brought into perfect focus will exhibit a maximum density of high frequency components in a frequency space representation of the image.

The portion of the image over which the fine feature sharpness score is calculated for a particular image region may, for example, include only those pixels of the acquired image that are completely within that focus region. In the exemplary embodiment, this portion includes all pixels within the acquired image at the focus setting for which the corresponding pixels in the aligned gray scale or binary region map have a weighting value 830 of one. In a preferred embodiment, a fine feature sharpness scoring technique should be used which yields a relatively continuous and smoothly varying sharpness curve as a function of focus setting (which is the case with those techniques suggested herein), which helps to ensure that false edges and boundaries are not generated in the final composite image at a subsequent step in this method. If any thresholding is performed in the process of computing the sharpness score, it should be a fuzzy thresholding technique such as those commonly known in the art. For example, a sigmoid function can be used which has an output of 0 when the input is substantially below the threshold, an output of 1 when the score is substantially above the threshold, and an output somewhere between 0 and 1 when the input is close to the threshold. It is important to note that there may be aligned focus regions 600 for which the sharpness score is never high even though it may in fact be in focus to a large degree. This situation occurs when a focus region contains no image details, such as visible defects, with which to assess the sharpness of the corresponding portion of the image.

The fine feature sharpness score, or fine feature sharpness measurement of step 575 can be represented by a normalized numerical calculation or score of the pose, region, or zone of the image. This calculation, or score, is then used in the next step 580 to compute a spatial weighting. One method of computing a spatial weighting is through the computation of an overall sharpness image.

An overall sharpness image is representative of the combined sharpness scores for each pixel in the acquired image for a given focus setting. This computation entails combining the computed sharpness scores for each of the focus regions 600 using the weighting values of the focus region definition determined during set-up at step 560. In the case where the aligned focus regions are represented as aligned gray scale region map images, this computation might entail independently combining, for each pixel location, the sharpness scores for each of the aligned focus regions using the corresponding weighting value 830 for the aligned focus regions 600.

Figure 9:
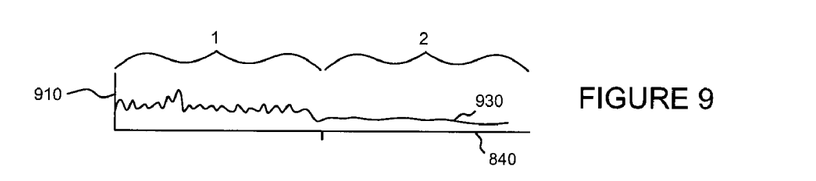
FIG. 9 is a graphical representation of a one-dimensional image of the exemplary embodiment of the present invention.
Figure 10:
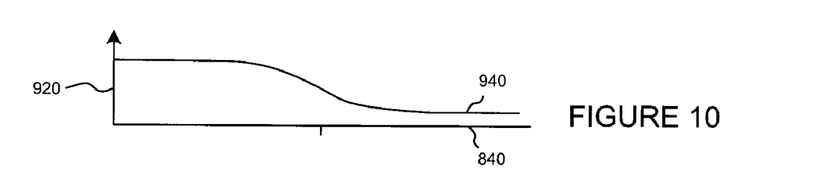
FIG. 10 is a graphical representation of the overall sharpness image of the exemplary embodiment of the present invention.

FIG. 9 is a graphical representation of a one-dimensional grayscale image acquired at a given focus setting. An image signal 930 in the coordinate system of pixel intensity 910 and pixel fragment position 840. The image signal 930 demonstrates much image detail in the first region, indicating a sharply focused portion of the image, while the relatively low image detail of region two indicates an out-of-focus image. Assume the fine feature sharpness score for region one is 0.95, and the fine feature sharpness score for region two is 0.18. FIG. 10 is a graphical representation of the sharpness image of step 580 for the image representation of FIG. 9. The overall sharpness image 940 can be computed by:

$$O_i = \frac{\sum_{j=1}^{n} r_{j_i} s_j}{\sum_{j=1}^{n} r_{j_i}}$$

where O is the overall sharpness image, i is the pixel, j is the region out of n regions, r is the region definition value, and s is the sharpness score.

In a preferred embodiment, this step must ensure that the composite image computed in a subsequent step does not introduce artifacts in the form of false edges or boundaries in the image of the object. This can be accomplished by combining the sharpness scores for each pixel location as a continuous function of the sharpness scores and region designation in a normalized fashion. One technique for combining the pixel values as a continuous function of the sharpness scores and region designation in a normalized fashion is to perform a weighted average, where the weights are the corresponding pixel values of the aligned region map images. An alternative technique is to perform a weighted geometric mean. An example of a normalized technique that does not employ a continuous function is one where the pixel value is computed as the one for which the corresponding weighted sharpness score is maximum, or one where the value is computed as the sharpness score corresponding to the maximum corresponding pixel value over the aligned region map images. An example of a non-normalized technique that does employ a continuous function is one where the pixel value is simply the weighted sum of the sharpness scores. In a preferred embodiment, the use of focus regions with overlapping, fuzzy boundaries in the previous steps helps to ensure that the overall sharpness images are continuous and smooth over the portions of the object corresponding to the boundaries of the regions where there are no depth discontinuities, which in turn helps to ensure that the final composite image computed in hereinafter described step 595, does not contain any artifacts in the form of false edges or boundaries in the image of the object. An alternate way to ensure smoothness and continuity of the overall sharpness images is to smooth the overall sharpness images via image processing operations commonly known in the art (e.g. Gaussian smoothing or other low pass filtering operation). However, care should be taken not to smooth over portions of the overall sharpness image corresponding to portions of the object where depth discontinuities of the object are known to exist.

For the application of inspecting the ends of polished fiber end connectors, a preferred embodiment is one where a weighted average is used to combine the sharpness scores for each pixel, and where the weights are the corresponding pixel values of the aligned region map images.

The image signal 930 and the overall sharpness image 940 are used to compute a composite image in step 595 such that all of the focus regions 600 can be represented in an optimal focus image. The computation of step 595 amounts to combining the acquired images of the object, i.e., the image signal 930, at each of the sampled focus settings using the corresponding overall sharpness image 940 for each of the focus settings. Specifically, the computation of step 595 involves independently combining for each pixel location the pixel values at those locations in the acquired images over the sampled focus settings using the corresponding overall sharpness scores for those pixel locations. This computation can be represented as an incremental weighted average:

$$w_{k_i} = w_{k-1_i} + O_{k_i}$$

$$C_{k_i} = \frac{C_{k-1_i} w_{k-1_i} + O_{k_i} P_{k_i}}{w_{k_i}}$$

where $w_k$ is the image of summed weights for focus settings 1 through k, $O_k$ is the overall sharpness image for the focus setting k; $P_k$ is the acquire image for focus setting k; and $C_k$ is the composite image for focus settings 1 through k.

It is important that the computation of a composite image in step 595 does not introduce artifacts in the form of false edges or boundaries in the image of the object. This can be accomplished by combining the pixel values for each pixel location as a continuous function of the sharpness scores and region designation in a normalized fashion. One technique for combining the pixel values as a continuous function of the sharpness scores and region designation in a normalized fashion is to perform a weighted average, where the weights are the pixel values of the overall sharpness image. An alternative technique is to perform a weighted geometric mean. An example of a normalized but non-continuous function of the sharpness scores and region designation is one where the pixel value is computed as the one for which the corresponding pixel value in the sharpness image is maximum. An example of a linear but non-normalized technique is one where the pixel value is simply the weighted sum. In the case where none of the overall sharpness images for a particular region contain a high value for a particular pixel (due to the fact that the focus region to which that pixel belonged had no features with which to measure the fine feature sharpness score), the value for the composite image will likely be some random linear and normalized combination of the corresponding pixels from the acquired images. However, this should be acceptable, since if there are no features, then the region will appear identically for each of the focus settings in any case. In fact, in one preferred embodiment, if all of the overall sharpness scores for a particular pixel location are below some threshold for a particular region, the pixel value for the composite image at that location can simply be replaced by the average of the pixel values in the acquired image.

Note that the computation of the overall sharpness images and the composite image might be incrementally performed on-the-fly for each of the sampled focus settings (for example, by accumulating the composite image by computing a running weighted average of each of the pixels), or it may be performed after all of the acquired and corresponding overall sharpness images have been computed at each of the sampled focus positions. It may even be performed after all of the scores for each of the aligned focus regions have been computed at each of the sampled focus positions. On-the-fly calculation has the advantage that each acquired image and overall sharpness image can be discarded before moving on to the next sampled focus setting, thereby saving on memory. One skilled in the art will appreciate that the above discussion relates to the calculation of an incremental weighted average. Alternatively, a straight weighted average can be computed by computing the composite image of all images stored in memory.

In the case where sharpness scores are normalized between 0 and 1, and region map images are used with pixel values between 0 and 1, one interpretation of the embodiment that uses weighted averages is based upon Bayesian probability theory. The value of a pixel within an aligned focus region map image might be interpreted as the probability of the corresponding pixel in the acquired image belonging to the corresponding focus region. A sharpness score of an aligned focus region might be interpreted as the conditional probability that the area in the corresponding acquired image is in focus, given that the image was acquired at a particular sampled focus setting. The value of a pixel within an overall sharpness image might be interpreted as the probability of that pixel being in focus, given that the acquired image was acquired at a particular sampled focus setting. The latter interpretation especially makes sense if the overall sharpness image is computed using a weighted average technique, which is similar to computing a posteriori probability. The computation of the composite image using a weighted average technique also loosely agrees with this Bayesian interpretation, since it would then be equivalent to computing the expected value of each of each of the pixels in an image of the object, given that they are all completely in focus.

Step 585 initiates a loop of changing the focus setting at step 590. The steps of align focus regions 570, fine feature sharpness score 575, computation of an overall sharpness image 580, and computation of a composite image 595 can be repeated on a newly acquired image at the new focus setting of step 590. The loop of step 585 can be continued until all focus regions 600 appear in the composite image.

An alternate embodiment to which the present invention can be applied is the inspection of optical lenses. Like fiber end faces, optical lenses are not flat and are even more translucent than fiber end faces (to the point of being perfectly transparent under most lighting conditions). Furthermore, it is desirable to detect and precisely measure the lens for defects such as scratches, cracks, chips, and debris, which requires maximally focused images of the defects. In the embodiment directed to lens inspection, a coarse feature sharpness for a lens object can be determined by first aligning a shape modeling the outer boundary of the lens (typically a circle) with the image of the lens obtained at a focus setting at which the lens is visible but not necessarily in focus. For example, one can train a rotation invariant and scale invariant search model for the shape and use the trained model to perform alignment, as can be done with the PatMax tool available from Cognex Corporation or the Hexsight tool available from Adept. A coarse feature sharpness for the lens can then be measured using a method similar to one described for the fiber end application. For example, one can apply a set of caliper tools (e.g. the Caliper Tool available from Cognex Corporation) along the boundary of the aligned shape in the image of the lens, and use the average contrast score of the caliper edge results as the coarse feature sharpness score. A search can then be applied in order to maximize the coarse feature sharpness, with an optional re-alignment step performed before each coarse feature sharpness measurement as needed. The search might, for example, employ a gradient descent technique, as described for the fiber end inspection embodiment and as known in the art. The computation of a fine feature sharpness score within any image region of the lens can be determined using one of the methods described for the fiber end inspection embodiment, such as the one involving measuring the density of high frequency components in an image transformed into frequency space, or the power spectrum, within a region.

As with fiber end inspection, the similar non-planar structure of the optical lens suggests the focus regions 600 may be annularly designated. Due to the transparent nature of the lens, however, there may even be several defects (e.g. cracks) visible at several different focal planes within the glass for a single region. A sharpness response for a region with defects at different focal planes may be multi-modal, with fine sharpness peaks at different focus settings. The resulting composite image will have the effect of averaging the images from the multiple focus settings; which can be useful for pass/fail inspection, though specific characterization of multiple defects may not be effective.

Further still, another embodiment of the invention is an automatic visual inspection of LCD (liquid crystal display) data matrices, which tend to be flat but are somewhat translucent. Reliable LCD data matrix inspection, the purpose of which is to detect scratches and other defects, requires an optimally focused image. Each LCD data matrix is contained in a frame, which provides a structure with respect to which an alignment can be performed in the coarse focus step. An alignment tool for this structure can be trained, for example, by supplying an example image of the display frame (optionally, with a mask image that omits other extraneous features in the image) to a rotation invariant and scale invariant alignment tool, such as PatMax or Hexsight, which can then be employed to align the frame, as commonly known in the art. The coarse feature sharpness score for each focus position can be similarly computed by applying a set of calipers tools along the boundary of the frame, if the dimensions of the frame are known, or by examining the contrast of edges detected within the vicinity of the frame, as described in the fiber end inspection application embodiment. Again, the search for the optimal coarse feature sharpness focus position can be performed in any of the ways previously described, as can the computation of fine feature sharpness and the search for a fine feature sharpness peak within the frame. In this case, it is sufficient to optimize the focus position in order to maximize the fine feature sharpness score for only a single region that includes the entire areas within the aligned frame, since an LCD data matrix is typically fairly flat. In this special case, the method of this invention simplifies to taking a pixel-wise weighted average of the acquire images, where the weights are determined by the sharpness scores computed over the entire single region for each focus setting.

Figure 11:
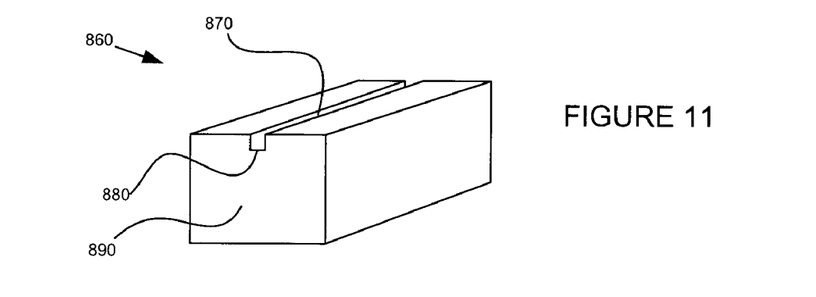
FIG. 11 is an isometric view of a laser diode in an exemplary embodiment of the present invention.

In yet another embodiment of the invention, inspection of rectangular laser diodes can be performed, as shown in FIG. 11. Typically, an inspection may be performed to identify defects such as cracks, scratches, debris, and ridges, often called "shingling," caused by non-uniform cutting during the dicing process (wherein the diodes are physically cut from one another from a single wafer). This inspection is especially important in a small region of the laser diode end face 890 from which the end of the wave-guide 870, a trough running along the top side of the laser diode 860, emits precision laser light used to transmit large amounts of data. Again, such inspection requires an optimally focused image. Since the shape of the laser diode is known (i.e. the length, width, and height of the device), a rectangular model of the end face of the diode can be used to train a rotation-scale invariant search tool, such as PatMax or Hexsight, which can then be used to align the model with the image of the laser diode end face 890. Again, any of the techniques described previously can be used for the computation of coarse feature sharpness along the rectangular boundary, the search over focus position for a maximum coarse feature sharpness, the computation of fine feature sharpness within the rectangular boundary, and the search over focus position for the maximum fine feature sharpness. In this embodiment, the fine focus region need only be limited to one region consisting of the rectangular diode end face 890, since it will be nominally flat and opaque, or even some small area around the end of the wave-guide where defects will cause serious problems.

Another embodiment for measuring the attributes of the fine feature sharpness score for a region is to use a standard auto-focus system that employs phase differencing, as employed by many commercially available cameras, and as known by those skilled in the art. An example of one type of phase detection, or phase differencing, is an autofocusing technique implemented in many photographic cameras, such as the one described in U.S. Pat. No. 4,373,791. The technique is based on separating the light rays coming from the objects after they passed through the camera lenses into more than one part, so that they form more than one image. The light ray separation, which can be done by separator lenses or by special photo sensor arrays and CDD's, is performed in such a way that the light rays coming from opposite edges of the camera lens are directed to different images planes or CCD sensors. The image sharpness can be calculated by comparing these images: if the two images are exactly the same, then the focus position is found. As applied to the present invention, the sharpness measurement can be represented as the inverse of the difference between the two images. Additionally the comparison of these images for phase difference of the dominant image structure will indicate if the desired focus plane is in front or behind the current position.

The present invention can employ the phase detection technique as a sharpness measurement for each coarse sharpness feature or fine sharpness feature, and as a method to determine the focus plane position direction for coarse focus. Special hardware may be necessary in the imaging setup so that light ray separation and the formation of the more than one difference image is possible. The images obtained by the light ray separation are used to determine the how close the focus plane is to the current focus position, which can be considered as a coarse or sharpness score depending on where the CCD elements of the difference images are placed. Note that, it may not be feasible to use these difference images for an alignment or an inspection process because they can be one-dimensional images or incomplete images. Therefore, after the coarse focus position is found, or if a full image is necessary for alignment purposes, a separate image on the main CCD is formed independent of the difference CCD's or images.

Generally, the invention can be applied to obtain a focused composite image of any structure for which an alignment model can be created, and for which coarse and fine feature sharpness metrics can be computed. The coarse focus score will be determined by examining the contrast of edges at the high contrast boundaries of the aligned object (though not necessarily the outer boundary) so that the focus can be coarsely set, and so that the image can be aligned. The fine focus score will be determined by examining the power spectrum or edge contrast within each of a set of predetermined focus regions of the object for a sampled set of focus settings about a coarse focus position.

Note that coarse or fine feature sharpness responses might include either absolute or relative measurements of the response without departing from the scope of this invention. For example, one could measure the difference between the sharpness response for a focus position and the sharpness scores of the neighboring focus positions. Even more simply, one could measure whether the sharpness score for a given focus position is higher or lower than the neighboring focus positions. Whether absolute or relative measurements are made, the purpose of the measurement is to score the sharpness of features in the portion of the image to compute a composite image of multiple images. A low sharpness score of a portion of an image results in a minimal effect of that portion of the image on the composite image. A high sharpness score of a portion of an image results in a significant effect of that portion of the image on the composite image.

While the invention has been described with reference to the certain illustrated embodiments, the words which have been used herein are words of description, rather than words of limitation. Changes may be made, within the purview of the appended claims, without departing from the scope and sprit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

I claim:

1. A method for generating a focused image of an object from an optical imaging system, the method comprising:
   providing a plurality of images of the object, each image having a focus setting;
   locating the object in at least one of the plurality of images to provide a known location of the object;
   defining a plurality of image regions using the known location of the object;
   measuring a sharpness score for each image region of at least two of the plurality of images;
   determining a spatial weighting for the image regions using the sharpness score; and
   computing a composite image of the object by combining each of the plurality of images using the spatial weighting.

2. The method of claim 1 wherein the step of defining a plurality of image regions further comprises:
   determining a set of focus regions on the surface of the object; and
   aligning at least one focus region in at least one of the plurality of images.

3. The method of claim 1 wherein the at least one of the plurality of image regions overlaps an adjacent image region using a fuzzy transition.

4. The method of claim 3 wherein the fuzzy transition is a function employing one of the set comprising sigmoid, gaussian and linear.

5. The method of claim 2 wherein the set of focus regions have a fuzzy transition.

6. The method of claim 5 wherein the fuzzy transition is a function employing one of the set comprising sigmoid, gaussian and linear.

7. The method of claim 1 wherein the plurality of image regions comprises a greyscale image map.

8. The method of claim 1 wherein the step of providing a plurality of images further comprises:
   determining a coarse focus position.

9. The method of claim 1 wherein the step of providing a plurality of images further comprises:
   determining a coarse focus position; and
   acquiring a plurality of images at an incremental focus setting.

10. The method of claim 2 wherein the object is a fiber optic cable end face.

11. The method of claim 10 wherein the set of regions are annular.

12. The method of claim 1 wherein the step of measuring a sharpness score further comprises:
    transforming each of the image regions of the at least two of the plurality of images so as to provide a plurality of spatial frequencies of the image regions;
    measuring a density of high spatial frequencies; and
    using the density of high spatial frequencies so as to provide a sharpness score.

13. The method of claim 1 wherein at least one of the plurality of image regions corresponding to a location on the object is defined such that the entire region will be in focus in at least one focus setting.

* * * * *